Figure 1:
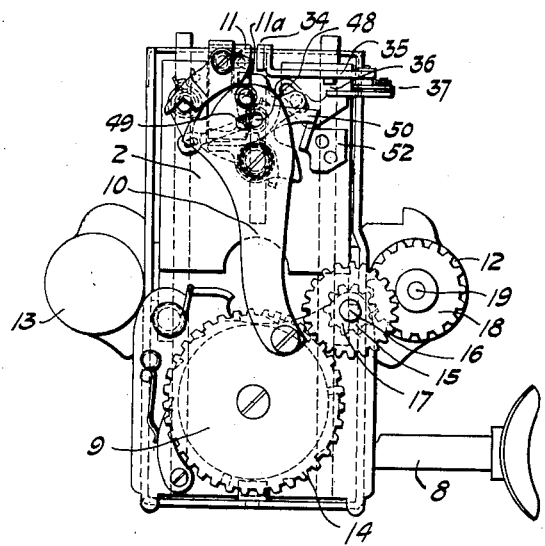

J. A. TURCK.
FARE REGISTER.
APPLICATION FILED OCT. 11, 1909.

1,160,215.

Patented Nov. 16, 1915.
3 SHEETS—SHEET 1.

Witnesses,
C. G. Bradley
J. H. Thurston

Inventor;
Joseph A. Turck,
By Wilmarth H. Thurston
Attorney

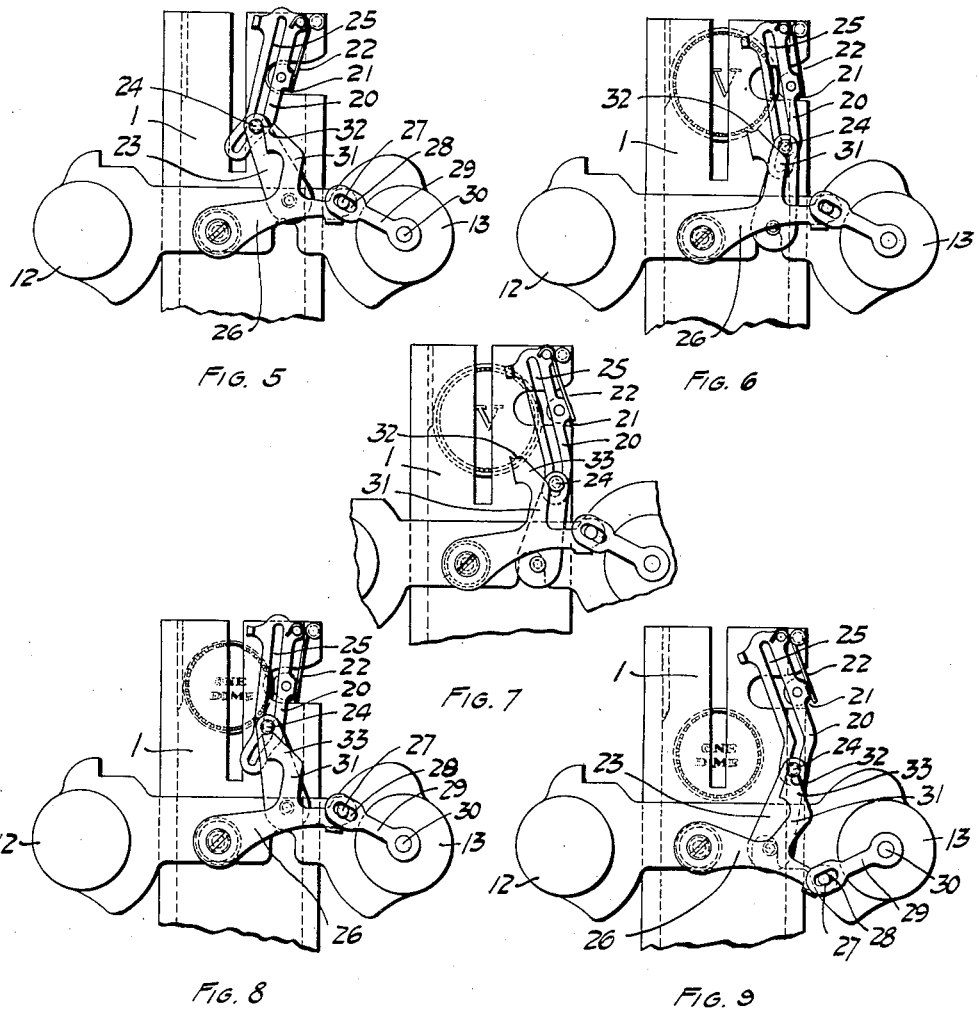

J. A. TURCK.
FARE REGISTER.
APPLICATION FILED OCT. 11, 1909.

1,160,215.

Patented Nov. 16, 1915.
3 SHEETS—SHEET 3.

Witnesses,
C. G. Bradley
J. H. Thurston

Inventor;
Joseph A. Turck,
By Wilmarth H. Thurston,
Attorney

UNITED STATES PATENT OFFICE.

JOSEPH A. TURCK, OF PROVIDENCE, RHODE ISLAND, ASSIGNOR TO ROOKE AUTOMATIC REGISTER COMPANY, OF PROVIDENCE, RHODE ISLAND, A CORPORATION OF MAINE.

FARE-REGISTER.

1,160,215.  Specification of Letters Patent.  Patented Nov. 16, 1915.

Application filed October 11, 1909. Serial No. 522,073.

*To all whom it may concern:*

Be it known that I, JOSEPH A. TURCK, of the city and county of Providence and State of Rhode Island, have invented certain new and useful Improvements in Fare-Registers; and I do hereby declare the following specification, taken in connection with the accompanying drawings, forming a part of the same, to be a full, clear, and exact description thereof.

The present invention relates to fare registers and more particularly to fare registers of the portable type such as forms the subject of Letters Patent No. 690,079, granted to George F. Rooke December 31, 1901. The fare register of said Rooke patent was adapted to register coins of one denomination only, as for example, nickels. By a subsequent invention on the part of Mr. Rooke which forms the subject of an application, Serial No. 505,370, filed July 1, 1909, such fare register was adapted to register coins of two different denominations, as for example, nickels and dimes.

In the improved fare register of Mr. Rooke's pending application referred to there are two registering counters for registering coins of different denominations, and the construction is such that one of these counters, which may be termed the primary counter, is operated by the coins of both denominations, as for example, both by the nickels and by the dimes, while the other counter, which may be termed the secondary counter, will be operated by only one of the coins, as for example, the dimes. With such construction the figures on the primary counter will correspond to the total number of coins passed through the machine, while the figures on the secondary counter will correspond to the total number of dimes passed through the machine, and the sum of the figures on the two counters will correspond to the total number of five-cent fares received and registered. In the improved fare register of said application the primary counter is operated directly from the sliding coin-carriage and so that said counter will be operated at each to and fro movement of said carriage, and means are provided for determining whether the secondary counter shall or shall not be operated. The means for thus determining whether the secondary counter shall or shall not be operated, and which may be termed selective means, is controlled by the coins themselves, one of said coins, as for example, the nickel, serving to control said selective means in a way to prevent the operation of the secondary counter, while the other coin, as for example, the dime, serves to control said selective means in such a way as to cause said secondary counter to be operated. By a still further invention on the part of Mr. Rooke which forms the subject of an application, Serial No. 521,810, filed Oct. 9, 1909, such fare register was further improved and so as to prevent registration on the dime counter when no coin was passed through the machine.

The fare register forming the subject of the present application is of the same general character and construction as the fare registers above described, and the object of the present invention is to simplify the construction of such fare register and to improve the operation thereof.

To that end one feature of the invention relates to the mechanism for operating the secondary or dime counter and consists in reducing the number of parts composing such counter operating mechanism, thereby simplifying the construction and lessening the cost of manufacture.

Another feature of invention consists in providing means for releasing the coin from the pressure of the roller carried by the pivoted arm or switch member of the selective means above referred to.

A further feature of invention consists in providing means for preventing the backing up of the gripping jaws and thereby preventing the withdrawal of the coin after it has once been grasped by said gripping jaws and preventing said gripping jaws when dull from slipping off of a smooth coin, as has sometimes happened.

The invention further consists of features of construction and combinations of parts hereinafter described and claimed.

Figure 2:
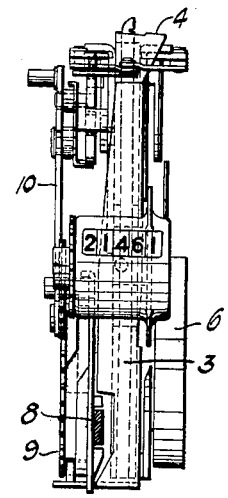
Figure 3:
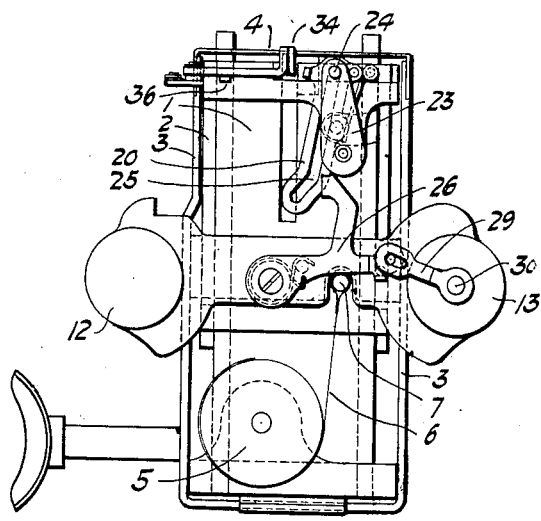
Figure 4:
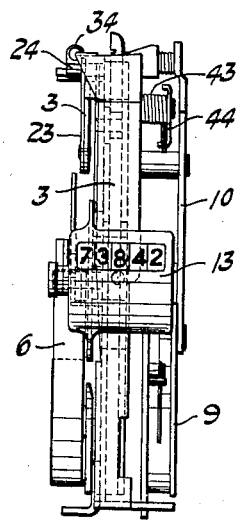
Figure 10:
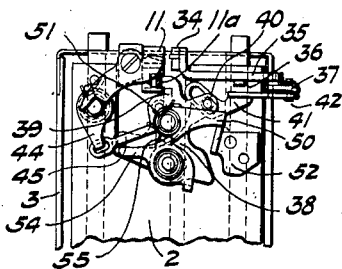
Figure 11:
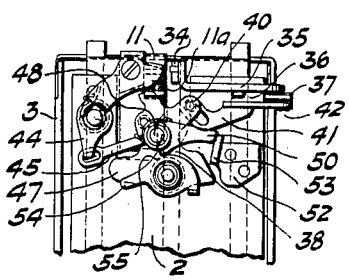
Figure 13:
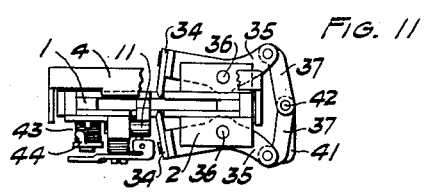
Figure 14:
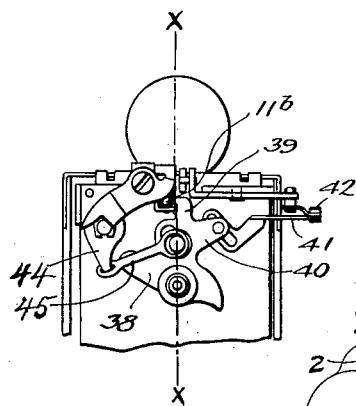
Figure 15:
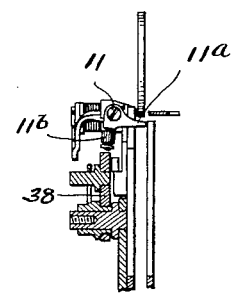
Figure 12:
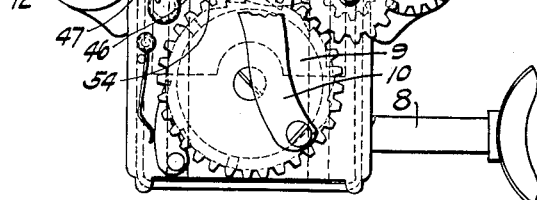

Referring to the drawings, Figure 1 is a front elevation of the mechanism of a fare register embodying my invention, the casing therefor being omitted. Fig. 2 is a side elevation looking toward the left in Fig. 1. Fig. 3 is a rear elevation of the mechanism. Fig. 4 is a side elevation looking toward the left in Fig. 3. Fig. 5 is a rear elevation corresponding to Fig. 3, but with certain parts broken away or omitted and showing the parts in the position which they occupy when the sliding carriage moves downward with no coin carried thereby. Fig. 6 is a like rear elevation but showing the parts in a different position, as determined by the insertion of a nickel. Fig. 7 is a like rear elevation showing the position of the parts after the coin has been released. Fig. 8 is a like rear elevation but showing the parts in position as determined by the insertion of a dime. Fig. 9 is a like rear elevation showing the position of the parts after the secondary counter has been operated. Fig. 10 is a front elevation of the upper end of the register mechanism showing the construction for blocking the gripping devices. Fig. 11 is a like front elevation showing said blocking devices in a different position. Fig. 12 is a front elevation of the registering mechanism showing said blocking devices in a still different position. Fig. 13 is a top view of the register mechanism showing the gripping devices. Fig. 14 is a front view of the upper portion of the mechanism with certain parts removed. Fig. 15 is a section on the line x—x of Fig. 14.

The general construction of the mechanism shown in the drawings is similar to that shown in said Patent No. 690,079, to which reference may be made.

1 represents the frame upon which the several parts are mounted, said frame having a longitudinal passage extending therethrough, and so that said frame also constitutes the coin-chute, said frame further constituting the guide for the sliding carriage 2. Pivoted to the frame or coin-chute on opposite sides thereof is a swinging rectangular frame 3, the upper end 4 of which constitutes a shutter for the upper end of the coin-chute. Mounted on the frame is a spring-motor 5. To the drum of said motor one end of a connecting strap 6 is secured, the other end of said strap being connected to a pin 7 on the sliding carriage. As more fully explained in the patent referred to, the carriage is moved upward by pushing inward the rack bar 8, the inward movement of said rack-bar serving to rotate the crank-wheel 9, said crank-wheel being connected to the sliding carriage by means of the pitman 10. By such construction, when the rack-bar is pushed inward, the crank-wheel 9 will be rotated in a direction to move the sliding carriage upward, and this upward movement of the sliding carriage will, through the strap connection 6, serve to wind up the spring of the spring-motor 5, and so that when permitted to do so said spring-motor will serve to pull the carriage downward.

The sliding carriage 2 is latched in its upper position against the pull of the spring-motor by a latch such as described in said prior patent, it being understood that said latch is adapted to be disengaged by the insertion of a coin and so as to thereby release the sliding carriage and permit the same to be pulled downward by the spring-motor. The release of the carriage by the insertion of a coin is effected by the action of a pivoted tripper 11. This pivoted tripper is in the form of a bell-crank lever, one arm 11ª of which extends across the upper end of the coin-chute in the path of the coin as shown in Fig. 15, and the other arm 11ª of which tripper serves to unlatch the latch which holds the carriage in its raised position.

The present machine is provided as shown with two counters 12 and 13 for registering coins of two different denominations, the counter 12 being what has been termed the primary counter for registering nickels and the counter 13 being the secondary counter for registering dimes. The counter 12 is actuated by a direct gear connection with the sliding carriage. As shown in Fig. 1, the crank-wheel 9 is provided with gear-teeth 14 which engage the teeth of a gear 15 mounted on a stud 16 secured to the frame. Secured to the gear 15 is a pinion 17 which meshes with a gear 18 secured to the shaft 19 of the counter 12. The arrangement is such that at each revolution of the crank-wheel 9 which takes place at each upward and downward movement of the carriage the shaft of the counter 12 will be given one complete revolution, and it is to be understood that one revolution of said countershaft serves to advance one of the numeral wheels of the counter one step.

The counter 13 is to be actuated only when a dime is passed through the machine and is not to be actuated when a nickel is passed through, and selective mechanism is therefore provided for determining whether said counter shall or shall not be operated, which selective mechanism, together with the mechanism for operating said counter 13, will now be described.

Pivoted to the frame is a pivoted arm or switch member 20 carrying a roll 21. Acting upon said pivoted arm 20 is a spring 22 which acts, when free to do so, to move the pivoted arm to the left and into the position shown in Fig. 5, and so as to bring the roll 21 into the coin-chute and into the path of either a dime or a nickel passing said chute. The arrangement is such that the passage of a dime past said roll will serve to move the pivoted arm 20 a certain distance to the right and from the position shown in Fig. 5 to the position shown in Fig. 8, while the passage of a nickel past said roll will, by reason of its larger diameter, serve to move said pivoted arm a greater distance to the right and from the position shown in Fig. 5 to the position shown in Fig. 6. It will be understood that at the time the coin is thus carried downward past the roll 21 by the action of the spring-motor on the sliding carriage, said coin is firmly grasped by gripping jaws carried by the carriage and to be hereafter more specifically referred to, and so that the coin thus firmly held constitutes in effect a cam, and as such cam acts by its engagement with the roll 21 to force back the slotted arm or switch 20 and move the same to the right in Figs. 5 to 9 inclusive, as above described. Pivoted on the sliding carriage is an arm 23. Extending through the upper end of said arm 23 is a pin 24 arranged to project on both sides of said arm. The forwardly projecting end of said pin 24 extends into the slot 25 formed in the pivoted switch 20, and said pin 24 is therefore caused, as the sliding carriage moves downward, to travel in said slot 25 whatever the position of the pivoted switch 20 may be.

As shown in the drawings, the lower free end of the pivoted switch member 20 is at an angle to the main portion or body of said switch, and the slot 25 in said switch is in consequence an angular slot, said switch and the slot therein being thus made angular for a purpose to be hereafter referred to. Pivoted to the frame is a lever 26. Projecting from the outer end of said lever is a pin 27 which extends into a slot 28 formed in a lever-arm 29 connected to the shaft 30 of the counter 13. Rigidly connected to the lever 26, and preferably formed integral therewith as shown, is an upwardly extending bent arm 31, the upper end of which arm is provided with a curved recess 32. Said upwardly extending arm 31 is also provided with an angular portion or cam surface 33 for a purpose to be hereinafter described.

The operation of the parts and devices above described for operating the secondary or dime-counter 13, and for determining whether said counter shall or shall not be operated, is as follows: With the parts in the position shown in Fig. 5, which is the normal position of the parts, it will be seen that the slot 25 in the pivoted switch 20 extends downward to the left of the upwardly extending bent arm 31. When, however, a dime is inserted in the register and is carried downward by the sliding carriage under the action of the spring-motor, such dime will come in contact with the roll 21 on the pivoted switch 20 and as the dime is at the time firmly grasped by the gripping jaws, such dime will, as above stated, act as a cam to force back or move to the right said pivoted arm and so as to bring the same into the position shown in Fig. 8. With said pivoted switch in this position it will be seen that the main or straight portion of the slot 25 in said arm is in line with the upper end of the upwardly extending arm 31. As the carriage continues to move downward, therefore, the forwardly projecting end of the pin 24 will be caused to travel downward in the slot 25, while the rearwardly projecting end of said pin will be brought into engagement with the upper end of the arm 31. As now the carriage continues to move downward a corresponding downward movement will be imparted to the arm 31 and through said arm to the lever 26. The downward movement of said lever 26 will actuate the lever 29 and thus operate the counter 13 to make one registration thereon. When now a nickel is inserted in the register and is carried downward by the sliding carriage under the action of the spring-motor, such nickel acting as a cam will, when it comes in contact with the roll 21 on the pivoted switch 20, serve to move said pivoted switch a greater distance to the right and into the position shown in Fig. 6. With said pivoted switch in this position it will be seen that the slot 25 in said arm extends downward to the right of the upper end of the arm 31 and so that as the carriage continues to move downward the rearwardly projecting end of the pin 24 will not engage the upper end of said arm 25, but will be carried past the end of said arm to the right thereof. The further downward movement of the carriage therefore in this case will not serve to impart any downward movement to the arm 25 and consequently the counter 13 will not be operated.

As will be seen, with the construction above described the pivoted switch 20 may occupy any one of three different positions, viz., its normal position, the position to which it will be moved by the passage of a dime, and the position to which it will be moved by the passage of a nickel. It will be further seen that when said pivoted switch occupies its normal position the counter 13 will not be operated, and that when said pivoted arm occupies the position to which it is moved by the passage of a nickel said counter 13 will likewise not be operated, and that it is only when said pivoted switch occupies the position to which it is moved by the passage of a dime that said counter will be operated.

As above stated, it is desirable to relieve the coin from the pressure of the roll 21 under the action of the spring 22. This is accomplished with the construction above described in a somewhat different manner in the case of a dime and in the case of a nickel, respectively, and the operation of the parts in each said will now be described. Referring first to the release of the dime, as the sliding carriage moves downward after the engagement of the rearwardly projecting end of the pin 24 with the upper end of the arm 31, the upper end of the arm 31 is caused to travel to the right in the arc of a circle described from the pivot of the lever 30, thereby causing the arm 23 and pin 24 to be moved to the right, which movement of the pin 24 will in turn be imparted to the pivoted arm 20. Such movement of the pivoted switch 20 to the right will serve to move the roll 21 out of engagement with the dime, and thereby release said dime from the pressure of said roll. The angular bend in the slot 25 serves to permit such movement of the parts, and in addition the walls of the angular portion of said slot act to a greater or less extent as cam surfaces to facilitate such movement. When a nickel is carried downward with the sliding carriage the rearwardly projecting end of the pin 24 does not engage the upper end of the arm 31, but is instead brought into engagement with the cam surface 33 on said arm, as shown in Fig. 6. As the carriage continues to move downward the rearwardly projecting end of the pin 24 is caused to ride down said cam surface 33, which has the effect to move the pivoted switch 20 to the right and so as to move the roll 21 out of engagement with the nickel, and thereby release said nickel from the pressure of said roll, as shown in Fig. 7. The angular bend in the slot serves to permit such movement of the parts and in addition the walls of the angular portion of said slot act to a greater or less extent as cam surfaces in coöperation with the cam surface 33 to facilitate such movement.

The next feature of invention relates to the means for blocking the gripping devices to prevent the backing up of the gripping jaws and the possible release of the coin from the grip of said jaws and which means will next be described. The gripping device comprises two movable gripping jaws 34, 34, adapted to grip the coin upon its opposite sides. Pivoted to suitable brackets on opposite sides of the sliding carriage are two levers 35, 35, on the inner ends of which the gripping jaws 34, 34 are mounted. The levers 35, 35, are pivoted at 36, 36, respectively, and the outer ends of said levers are connected by a pair of toggle-links 37, 37. Pivoted on the carriage 2 is an oscillating plate or lever 38 having two projections or arms 39 and 40. The arm 39, when the carriage is raised, abuts against the arm 11$^b$ of the tripper 11, as shown in Fig. 14 while the arm 40 is connected to a link 41, said link 41 being bent around the side of the frame and connected to the pivot 42 of the toggle-links. Suitably mounted on the carriage 2 at one side of the oscillating plate 38 is a torsion-spring 43 adapted to actuate the pivoted arm 44. A link 45 connects said pivoted arm with the oscillating plate 38, the construction being such that when the carriage is in its elevated position the spring 43 tends to pull the oscillating plate to the left in Figs. 1 and 10, and so as to hold the arm 39 against the arm 11$^b$ of the trigger 11, and so that when said trigger is tripped by the insertion of a coin and the arm 11$^b$ thereby moved out of the path of the arm 39, said oscillating plate will be moved to the left and into the position shown in Fig. 11 by the action of said spring. This movement of said oscillating plate will serve through the connecting link 41 to straighten the toggle-links and thereby move the gripping jaws inward into engagement with the coin. When the tripper 11 is thus tripped by the coin and so as to move the arm 11$^a$ out of the path of the arm 39 of the oscillating plate, and so that said oscillating plate is then free to be moved to the left by the action of the spring 43, such movement of said oscillating plate serves to unlatch the sliding carriage which now begins to descend under the action of the spring-motor 5. Secured to the frame is a cam projection 46. The oscillating plate 38 has still another arm 47 which is so arranged that as the carriage descends said arm 47 will come in contact with the cam projection 46. As the carriage continues to descend the cam projection 46 through its engagement with the arm 47 serves to rock the oscillating plate 38 to the right in Fig. 12 and this movement of said oscillating plate serves through the connecting link 41 to open the toggle 37 and thus open the gripping jaws and release the coin from the grip thereof.

It will be noted that as the oscillating plate is moved by the cam projection 46 to open the gripping jaws, such movement of the oscillating plate will, through the connecting link 45, rock the arm 44 so as to set up tension in the torsion-spring 43. As will be seen, it is necessary to hold the gripping jaws open and thus to hold the oscillating plate 38 against the action of the torsion-spring 43 when tension has been set up in said spring in the manner described, and for this purpose a connection is made between said oscillating plate and the pitman 10, said connection consisting of a pin 48 which projects from said oscillating plate through an elongated slot 49 formed in said pitman. The arrangement is such that when the cam projection 46 has ceased to act upon the arm 47 of the oscillating plate the pitman will have arrived at a position to bring the end of the slot 49 against the pin 48, and so that during the upward movement of the carriage the gripping jaws will be held open against the action of the spring 43 by the engagement of the end of the slot 49 with said pin 48 until the arm 39 of the oscillating plate comes into engagement with the arm 11$^b$ of the tripper 11, and thereafter the gripping jaws will be held open by the engagement of said arm 39 with said arm 11$^b$.

Referring now to the means provided for blocking the gripping jaws and preventing the backing up of the same, a pivoted dog 50 is pivoted to the oscillating plate 38, being pivoted on the pin 48 above referred to. Mounted on said pin 48 is a torsion-spring 51, one end of which is hooked over the link 45 and the other end of which spring is arranged to bear upon the pivoted dog 50 in a direction to move the outer or free end of said dog downward. Rigidly secured to the sliding carriage is a fixed block or abutment 52. Preferably, and by reason of the varying thicknesses of the coins to be gripped by the gripping dogs, said block or abutment 52 is provided with an angular face 53, as shown in the drawings. Pivoted on the hub of the oscillating plate 38 is a releasing lever 54 adapted as the carriage moves downward to engage the cam 46 on the frame. Said lever 54 is provided with a projection 55 arranged to engage a corresponding projection on the pivoted dog 50, as shown in the drawings.

The operation of the means for thus blocking the gripping jaws is as follows: When the sliding carriage 2 is in its upper position the free end of the pivoted dog 50 overlies the top of the block 52, as shown in Fig. 10. When now the sliding carriage is unlatched and the gripping jaws are actuated in the manner above described to grip the coin, the rocking of the oscillating plate 38 under the action of the spring 43 serves to draw the pivoted dog 50 to the left in Fig. 10 and out of engagement with the top of the block 52. As soon as the pivoted dog 50 is thus moved out of engagement with the top of the block 52 the torsion-spring 51 serves to turn said pivoted dog into the position shown in Fig. 11 and so as to bring the end of the dog in line with the face of the block 52 and cause the end of the dog to abut against the face of said block, as shown in said Fig. 11. As will be seen, the engagement of the end of the pivoted dog 50 with the face of the block 52 will prevent any backward movement of the oscillating plate 38 and will consequently prevent any backward movement or any backing up of the gripping jaws.

The purpose of forming the face of the block 52 at an angle or providing the beveled face 53 is to insure the engagement of the end of the pivoted dog 50 with the block 52 in case of coins of varying thickness. Thus with an old-style nickel which is thicker than a new-style nickel, the oscillating plate 38 will, by the engagement of the gripping jaws with the coin, be prevented from moving beyond a certain point and in such case the pivoted dog will engage the angular face of the block 52 at or near the upper end thereof. If the coin is thinner, as in the case of a new-style nickel and so that the gripping jaws can move nearer together, the oscillating plate will be moved a correspondingly greater distance, and in such case the pivoted dog will be swung downward by its spring a correspondingly greater distance and will thus engage the angular face of the block 52 at a lower point on said face, while in the case of a dime which is still thinner the end of the pivoted dog will engage the angular face of the block 52 at a still lower point on said face. The angle of the face 53 of the block 52 is such that the end of the dog 50 will be sure to abut against said face in the case of the thinnest coin. As the carriage continues to move downward, and preferably just in advance of the release of the coin from the gripping jaws, the tail of the pivoted releasing lever 54 comes in contact with the flat surface of the cam 46, as shown in Fig. 12. The further downward movement of the carriage therefore will cause the lever 54 to be turned about its pivot and such turning of said lever will, by reason of the engagement of the projection 55 with the corresponding projection on the pivoted dog 50, serve to turn the pivoted dog upon its pivot in a direction to move the free end of said dog upward and from the position shown in Fig. 11 to the position shown in Fig. 12, the end of said pivoted dog being thus raised above the top of the block 52. The swinging of the oscillating plate 38 to the right in Fig. 12 by the engagement of the arm 47 with the cam 46 as the carriage moves downward will serve to return the pivoted dog 50 to its normal position, and with the free end of said dog resting upon the upper end of the block 52, as shown in Fig. 11, and so that thereafter said block 52 will serve to hold the pivoted dog 50 in its raised position against the action of the spring 51 until the carriage is again unlatched and the oscillating plate again swings to the left.

By the construction above described, as will be seen, the gripping jaws after they have acted to grip the coin are positively blocked against backward movement or positively prevented from backing up and so as to prevent the withdrawal of the coin from the register after it has been once grasped by the gripping jaws.

What I claim as my invention and desire to secure by Letters Patent is:

1. In a fare register, the combination of a registering counter, a switch adapted to be operated by the coin for determining whether said counter shall or shall not be operated, and means for releasing the coin from said switch.

2. In a fare register, the combination of a sliding carriage adapted to receive a coin, a registering counter adapted to be operated by said sliding carriage, a switch adapted to be operated by said coin for determining whether said counter shall or shall not be operated, and means for releasing the coin from said switch.

3. In a fare register, the combination of a sliding carriage adapted to receive a coin, a registering counter, devices adapted to connect said carriage and said counter, a switch adapted to be operated by said coin, and means for releasing the coin from said switch.

4. In a fare register, the combination of a registering counter, a spring-pressed switch adapted to be operated by the coin for determining whether said counter shall or shall not be operated, and means for releasing the coin from the pressure of said switch.

5. In a fare register, the combination of a registering counter, a switch adapted to be operated by the coin for determining whether said counter shall or shall not be operated, and means for moving said switch away from said coin after the switch has been operated by said coin.

6. In a fare register, the combination of a registering counter, a switch adapted to be operated by the coin for determining whether said counter shall or shall not be operated, and a cam for moving said switch away from said coin after the switch has been operated by said coin.

7. In a fare register, the combination of a carriage, a registering counter, a detachable connection between said carriage and said counter embodying a pivoted lever provided with a rigid arm and a pin carried by said carriage and adapted to engage said rigid arm, and a switch for controlling the engagement of said pin and arm.

8. In a fare register, the combination of a carriage, a registering counter, a detachable connection between said carriage and said counter embodying a pivoted lever provided with a rigid arm and a pin carried by said carriage and adapted to engage said rigid arm, and a switch for controlling the engagement of said pin and arm, said switch being provided with a slot in which said pin travels.

9. In a fare register, the combination of a carriage, a registering counter, a detachable connection between said carriage and said counter embodying a pivoted lever provided with a rigid arm, and a pin carried by said carriage, and a switch for controlling the engagement of said pin and arm, said switch being provided with an angular slot in which said pin travels.

10. In a fare register, the combination of a carriage adapted to receive a coin, a registering counter adapted to be operated by said carriage, and a switch adapted to be operated by said coin, said switch being provided with an angular slot.

11. In a fare register, the combination of a carriage adapted to receive a coin, a registering counter adapted to be operated by said carriage, a pivoted lever provided with a rigid arm for operating said counter, and a switch adapted to be operated by said coin, said switch being provided with an angular slot.

12. In a fare register, the combination of a carriage adapted to receive a coin, a registering counter adapted to be operated by said carriage, a pivoted lever provided with a rigid arm for operating said counter, said rigid arm being provided with a cam surface, and a switch adapted to be operated by said cam, said switch being provided with an angular slot.

13. In a fare register, the combination of a carriage, a registering counter, a pivoted lever provided with a rigid arm for operating said counter, and a movable member carried by said carriage and adapted to engage said rigid arm to operate said counter.

14. In a fare register, the combination of a carriage, a registering counter, a pivoted lever provided with a rigid arm for operating said counter, an arm pivoted to said carriage and adapted to engage said rigid arm to operate said counter.

15. In a fare register, the combination of a carriage, a registering counter, a pivoted lever provided with a rigid arm for operating said counter, a projection carried by said carriage and adapted to engage said rigid arm, and a switch for controlling the engagement of said projection and said arm.

16. In a fare register, the combination of a pair of gripping jaws for gripping the coin, and means adapted to prevent the backing up of said gripping jaws.

17. In a fare register, the combination of a carriage, a gripping device carried by said carriage, and means adapted to prevent the backing up of said gripping device.

18. In a fare register, the combination of a carriage, a gripping device carried by said carriage, and means adapted to prevent the backing up of said gripping device with coins of different sizes.

19. In a fare register, the combination of a pair of gripping jaws, and means for positively blocking said gripping jaws.

20. In a fare register, the combination of a carriage, a gripping device carried by said carriage, and means for positively blocking said gripping device.

21. In a fare register, the combination of a carriage, a gripping device carried by said carriage, means for positively blocking said gripping device, and means for releasing said blocking means.

22. In a fare register, the combination of a carriage, a gripping device carried by said carriage, a pivoted dog connected with said gripping device, and a block carried by said carriage and adapted to be engaged by said pivoted dog.

23. In a fare register, the combination of a carriage, a gripping device carried by said carriage, a pivoted dog connected with said gripping device, and a block carried by said carriage and adapted to be engaged by said pivoted dog, said block being provided with an angular face.

24. In a fare register, the combination of a carriage, a gripping device carried by said carriage, a pivoted dog connected with said gripping device, a block carried by said carriage and adapted to be engaged by said pivoted dog, and means for disengaging said dog from said block to release said gripping device.

JOSEPH A. TURCK.

Witnesses:
W. H. THURSTON,
J. H. THURSTON.